United States Patent
Rotheiser et al.

[11] Patent Number: 5,935,281
[45] Date of Patent: Aug. 10, 1999

[54] FILTER APPARATUS

[75] Inventors: Jordan Rotheiser, Highland Park, Ill.; Kenneth B. Barrett, Jamesville; Yehia Mahmoud Amr, Manlius, both of N.Y.

[73] Assignee: Carrier Corporation, Syracuse, N.Y.

[21] Appl. No.: 08/997,492

[22] Filed: Dec. 23, 1997

[51] Int. Cl.⁶ .................................................. B01D 46/00
[52] U.S. Cl. ........................... 55/385.3; 55/495; 55/498; 55/502; 55/510
[58] Field of Search .............................. 55/493, 495, 498, 55/483, 385.3, 502, 527, 524, 510, DIG. 34; 123/198 E

[56] References Cited

U.S. PATENT DOCUMENTS

| | | | |
|---|---|---|---|
| Re. 34,980 | 6/1995 | Rau et al. | 55/467 |
| 3,375,933 | 4/1968 | Rodman . | |
| 4,215,665 | 8/1980 | Stambaugh | 55/385.3 |
| 4,304,580 | 12/1981 | Gehl et al. . | |
| 4,323,369 | 4/1982 | Monson et al. | 55/385.3 |
| 4,347,068 | 8/1982 | Cooper | 55/385.3 |
| 4,482,365 | 11/1984 | Roach | 55/473 |
| 4,632,682 | 12/1986 | Erdmannsdorfer . | |
| 4,671,873 | 6/1987 | Keller . | |
| 4,854,953 | 8/1989 | Van Weerden et al. | 55/483 |
| 5,000,851 | 3/1991 | Kueffer et al. | 55/480 |
| 5,112,372 | 5/1992 | Boeckermann et al. . | |
| 5,120,337 | 6/1992 | Benzler et al. . | |
| 5,125,941 | 6/1992 | Ernst et al. . | |
| 5,137,557 | 8/1992 | Behrendt et al. . | |
| 5,167,683 | 12/1992 | Behrendt et al. . | |
| 5,207,811 | 5/1993 | Buonpastore . | |
| 5,209,845 | 5/1993 | Sims . | |
| 5,275,636 | 1/1994 | Dudley et al. . | |
| 5,320,653 | 6/1994 | Morgan et al. . | |
| 5,484,466 | 1/1996 | Brown et al. . | |
| 5,487,767 | 1/1996 | Brown . | |
| 5,536,290 | 7/1996 | Stark et al. . | |
| 5,547,480 | 8/1996 | Coulonvaux . | |
| 5,556,440 | 9/1996 | Mullins et al. . | |
| 5,605,555 | 2/1997 | Patel . | |
| 5,713,972 | 2/1998 | Snyder, Sr. | 55/385.3 |

*Primary Examiner*—Jay H. Woo
*Assistant Examiner*—Minh-Chau T. Pham
*Attorney, Agent, or Firm*—William W. Habelt

[57] ABSTRACT

A filter assembly 10 includes a housing 12 defining a filter chamber having a first region forming a contaminated air inlet chamber 30 and a second region forming a clean air outlet chamber 40. A filter element 20 extends within the housing between the inlet chamber 30 and the outlet chamber 40. A flow barrier member 60 protrudes from the housing into a cooperating groove 70 provided in the end face of the filter element 20. The flow barrier forms a labyrinth type seal blocking contaminated air from bypassing the filter element.

4 Claims, 2 Drawing Sheets

FILTER APPARATUS

TECHNICAL FIELD

The present invention relates generally to a filter apparatus for removing contaminants from a fluid stream and, more particularly, to an air filter for removing entrained particulate matter from the intake air on a diesel engine.

BACKGROUND ART

In order to prevent possible engine damage, it is desirable to preclean the combustion air on an internal combustion engine. Customarily, the engine intake air passes through a filter apparatus to remove entrained particulate matter from the intake air stream prior to entering the combustion chamber of the engine. Such filter apparatus, frequently referred to as air precleaners, are used not only on combustion engines for powering vehicles, but are also commonly used on diesel engines in general, including for example the diesel engines which power the compressors and fans on transport refrigeration units.

One type of filter apparatus commonly used in connection with such combustion engines comprises an essentially cylindrical, pot-like housing defining a filter chamber that houses an annular cartridge-like filter element. An end cover, mounted to the open end of the filter housing, retains the filter element within the housing. The filter element has an axially extending, central bore, that defines an outlet chamber for filtered, that is clean, air. Being axially centered within the housing, the filter element, in conjunction with the surrounding wall of the housing, defines an axially elongated, annular unfiltered air inlet chamber positioned radially outwardly of and circumscribing the filter element.

In operation, incoming unfiltered engine intake air passes into the annular inlet chamber, typically, either tangentially through one or more openings in the wall of the housing or axially through a plurality of openings formed along a radially outer circumferential path in the end cover. From the inlet chamber, the unfiltered engine intake air passes generally radially through the filter element into the clean air outlet chamber defined by the central bore. As the intake air passes through the filter element, typically drawn by suction from the engine, entrained particulate contaminant matter is removed. The filtered engine intake air passes from the central outlet chamber through a central opening in the end cover and thence to the combustion air manifold for supply to the combustion chamber of the engine.

As the incoming engine intake air is drawn by suction from the engine through the filter element, the pressure of the air drops. As a result, a pressure differential exists between the inlet air chamber and the outlet air chamber. Consequently, the incoming unfiltered air has a natural tendency to seek a path of least resistance around the ends of the filter element and into the clean air outlet chamber. As such bypass leakage results in unfiltered, contaminated air passing directly into the clean air outlet chamber, and thereafter into the combustion chamber of the engine, it is desirable to provide a seal at each end of the filter element to preclude unfiltered, contaminated air from bypassing the filter element.

For example, it is common in the art to provide a gasket seal at the interfaces of the respective axial ends of the filter element and housing and the end cover, respectively. However, due to improper positioning, vibration during operation, slack tolerances and other reasons, the seal between the gasket face and the end of the element or the housing or the end cover, as the case may be, may not remain air tight and leakage across the seal may result. Gasket seals may also leak in operation due to vibration, improper positioning of the filter element or other factors.

SUMMARY OF THE INVENTION

It is an object of the present invention to substantially eliminate the bypass of unfiltered fluid around a filter element. It is an object of one particular aspect of the present invention to substantially eliminate the bypass of contaminated air around a filter element in a filter assembly having a clean air outlet chamber separated from a contaminated air inlet chamber by the filter element.

The filter assembly of the present invention includes a housing defining a filter chamber, a fluid flow inlet opening to a first region of the filter chamber and a fluid flow outlet opening to a second region of the filter chamber. A filter element extends within the housing between the first region of the filter chamber for receiving unfiltered contaminated air and the second region of the filter chamber for receiving filtered air having passed through the filter element. A flow barrier protruding from the housing along an interface between the first and second regions extends into the body of the filter element to block fluid flow from bypassing the filter element. Due to the physical presence of the flow barrier penetrating into the body of the filter element, all incoming air must traverse the body of the filter element in order to pass from the unfiltered air inlet chamber to the clean air outlet chamber.

In one embodiment of the present invention, the filter element comprises a canister-type filter element having an axially elongated filter media body having a central bore, a first end face at one axial end of the body and a second end face at the opposite axial end of the body. In accordance with the present invention, at least one of the end faces has a generally circumferentially extending groove formed therein. In some embodiments, each of the end faces of the filter element has a circumferentially extending groove fonned therein. In all embodiments, the groove penetrates axially into the filter media body and defines a cavity for receiving a flow barrier protruding from the filter housing. Further, the groove in the end face extends fully about the central core of the filter media that forms the clean air discharge chamber. Therefore, when installed in the filter housing with the groove receiving the flow barrier, the groove and flow barrier function cooperatively to not only provide an effective seal between the unfiltered air inlet chamber and the clean air outlet chamber, but also to center the filter media relative to the clean air outlet opening in the end cap of the filter housing.

BRIEF DESCRIPTION OF THE DRAWINGS

The present invention will be described herein with reference to the drawings wherein.

DETAILED DESCRIPTION OF A PREFERRED EMBODIMENT

Figure 1:
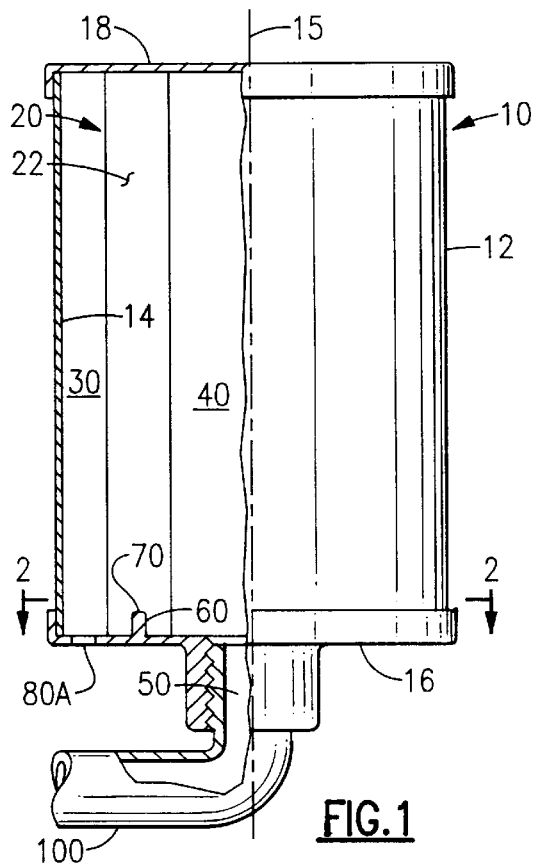
FIG. 1 is a side elevation view, partly in section, of a canister-type embodiment of the filter apparatus of the present invention.

The filter apparatus and the filter element of the present invention will be described herein in application as an engine air intake filter on an internal combustion engine, such as for example a diesel engine for driving the compressor, the evaporator fan and generator on a transport refrigeration unit. However, the filter apparatus and filter element of the present invention is also applicable to air filters for internal combustion engines used to power on-road and off-road motor vehicles, as well as to fluid flow filtering in general. Implementation of the present invention is not limited to the filter apparatus embodiments depicted and described in detail herein.

Referring now to the drawings in general, the filter apparatus 10 includes an outer housing 12 defining a filter chamber. The filter housing 12 comprises a generally cylindrical body 14 extending along a central axis 15 and end closure members 16 and 18 at the axially opposite ends of the body 14. The end closure members 16 and 18 may both be detachably secured end caps, for example by threading, clamping or otherwise. Alternatively one of the two may be formed integrally with the body 14 to provide a pot-like shaped housing having a detachable end cap at its open end.

A filter element 20 is disposed and supported within the housing 12 so as to extend axially between the end closure members 16 and 18 in spaced relationship with the cylindrical body 14. The filter element 20 comprises an annular, axially extending filter body 22 of generally cylindrical shape having an axially extending central bore passing therethrough. In applications for filtering particulate matter from air, the filter body 22 of the filter element 20 typically comprises a pleated paper type filter element or a fabric mesh type filter element. For other filtering applications, for example chemical sorption, the filter body 22 may comprise an element formed of a flow permeable foam material, polyester fleece, fiberglass wool, or any other type of fluid flow permeable, sorptive filter material. The particular material forming the filter body 22 is not germane to the invention.

The filter element 20 is disposed within the housing 12 in spaced relationship radially therewith, thereby partitioning the filter chamber into an inlet chamber 30 for receiving incoming contaminated air to be filtered and a outlet chamber 40 for receiving clean, filtered air. Being formed between the housing 12 and the radially outward surface of the filter element 20, the inlet chamber 30 is annular. The outlet chamber 40 is defined by the central bore extending axially through the filter element 20. Incoming air to be filtered passes into the inlet chamber 30 through air inlet means provided in the housing 12 and clean, filtered air passes from the outlet chamber 40 through a central outlet opening 50 provided in the closure member 16. As the filter element 20 forms the interface between the unfiltered air inlet chamber 30 and the clean filtered air outlet chamber 40, incoming air drawn by suction into the air intake tube 100 of the diesel engine (not shown) traverses the filter element 20 as it passes from the unfiltered air inlet chamber 30 into the clean, filtered air outlet chamber 40 and thence through the central outlet opening 50.

Figure 2:
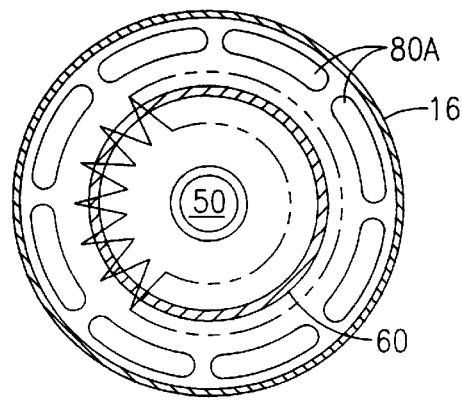
FIG. 2 is a section view taken along line 2—2 of FIG. 1.

In the embodiment of the filter apparatus 10 of the present invention depicted in FIGS. 1 and 2, a plurality of circumferentially spaced holes 80A in the end closure member 16 collectively comprise the air inlet to the inlet chamber 30. The holes 80A are formed at spaced intervals in a circumferentially extending path spaced radially outward of the central outlet opening 50 and in alignment with the annular inlet chamber 30. In this embodiment, the incoming air flows in a generally axial direction into the inlet chamber 30. In the embodiment of the filter apparatus 10 of the present invention depicted in FIGS. 3 and 4, an opening 80B in the wall of the housing body 12 comprises the air inlet to the inlet chamber 30. In this embodiment, the incoming air flows tangentially into the inlet chamber 30. Alternately, the air inlet to the unfiltered air inlet chamber 30 may be formed in the opposite end closure member 18 or in the side wall of the housing body 12 at a location near one of the closure members 18 or at any axial extent along the side wall 14 of the housing body 12. Whether the incoming unfiltered air is admitted tangentially or axially into the inlet chamber 30, is to germane to the present invention. Further, the number, size and configuration of the circumferentially spaced air inlet holes (80A in FIG. 2 and 80C in FIG. 7) is a matter of selection by the skilled designer and is not germane to the present invention.

In accordance with the present invention, a barrier member 60 projects from the housing into a groove 70 formed in the filter element 20 so as to form a flow barrier means for blocking fluid flow from bypassing the filter element 20 when flowing from the unfiltered air inlet chamber 30 to the clean air outlet chamber 40. The filter element 20 is disposed in the housing so as to extend along an interface between and separate the unfiltered air inlet chamber 30 from the clean air outlet chamber 40. The groove 70 is formed in a surface of the filter element 20 extending along this interface. In the prior art, if the filter element is slightly loosely positioned within the housing, for example due to manufacturing tolerances and vibration, a gap could form during operation between the end face of the filter element and the surface of the end closure member. In the filter assembly of the present invention, the physical presence of the flow barrier element 60 penetrating into the groove 70 in the filter element prevents unfiltered air from passing through such a gap directly from the inlet chamber into the clean air outlet chamber. The flow barrier element 60 forms a labyrinth type seal thereby causing any unfiltered air entering such a gap from the inlet air chamber to pass through the filter element 20 as it flows around the distal end of the flow barrier element 60. As the barrier element 60 penetrating into the groove 70 forms a labyrinth seal, rather than a contact seal, vibration and loose fit, do not lead to a dirty air leak into the clean air chamber as possible in prior art filters.

In the embodiment of the present invention depicted in FIGS. 1 and 2, a groove 70 is formed in the end face of the filter element 20 facing the end closure member 16 so as to extend about a circumferential path. A barrier member 60, extending about a corresponding circumferential path lying radially outwardly of the clean air outlet 50 and radially inwardly of the air inlet openings 80 A, projects from the end closure member 16 into the groove 70.

Figure 3:
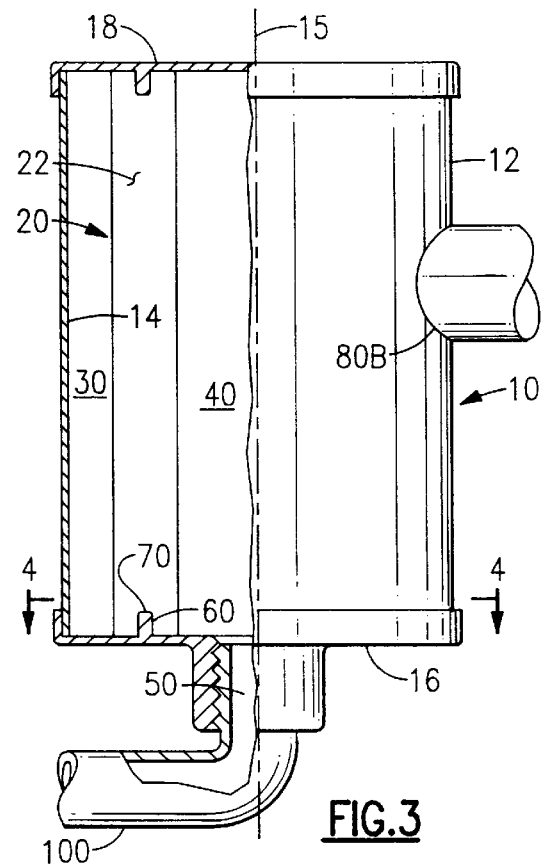
FIG. 3 is a side elevation view, partly in section, of a alternate canister-type embodiment of the filter apparatus of the present invention.
Figure 4:
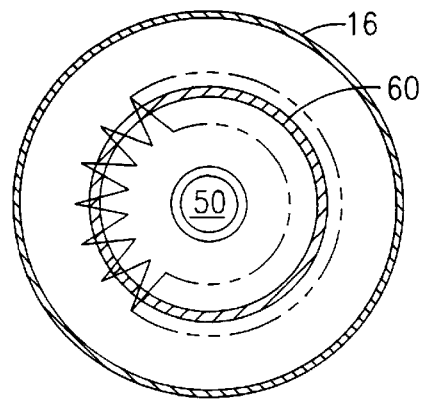
FIG. 4 is a section view taken along line 4—4 of FIG. 3.

In the embodiment of the filter apparatus of the present invention depicted in FIGS. 3 and 4, a groove 70 is formed in both end faces of the filter element 20, each extending along a circumferential path. A barrier member 60 projects from each of the end closure members 16 and 18 into the groove 70 in the respective abutting end face of the filter element 20. Each barrier member 60 extends about a corresponding circumferential path opposite and coincident to the groove 70 in the respective abutting end face of the filter element 20. In the end closure member 16 at the clean air outlet end of the filter apparatus, the barrier member 60 again circumscribes the clean air outlet 50.

The flow barrier element may be formed integrally with the housing or comprise a separate element mounted on the housing. In the embodiment depicted in FIG. 5, the flow barrier member 60 comprises a ridge formed integrally, for example stamped, in the end closure member 16. In the embodiment depicted in FIG. 6, the flow barrier member 60 comprises an upstanding rib extending outwardly from the end closure member 16. This rib may comprise a member welded, brazed, glued, machined or otherwise secured to or formed on or in the end closure member. The flow barrier member could also be formed as an integral part of a molded or cast end closure member.

As noted hereinbefore, when the filter element 20 is installed within the filter assembly 10 with the flow barrier member 60 received within the groove 70 in the filter element, a labyrinth type seal is formed. Additionally, proper alignment and positioning of the filter element 20 within the filter assembly 10 is assured. Only when the filter element 20 is properly aligned along the axis 15 of the filter assembly 10 will the flow barrier member 60 enter into the groove 70 in the filter element. Thus, the cooperating flow barrier member 60 and filter element groove 70 function not only to form a labyrinth type seal, but also to center the filter element 20 with the filter assembly 10.

Figure 7:
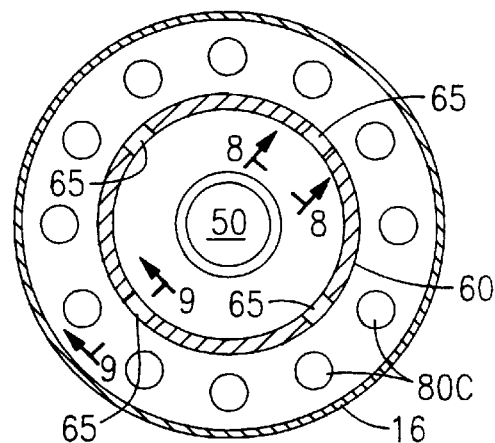
FIG. 7 is a plan view, part in section, of another embodiment of a filter assembly end cap with the flow barrier of the present invention.
Figure 8:
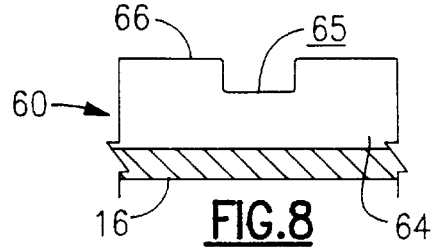
FIG. 8 is a side elevational view, partly in section, taken along line 8—8 of FIG. 7.
Figure 9:
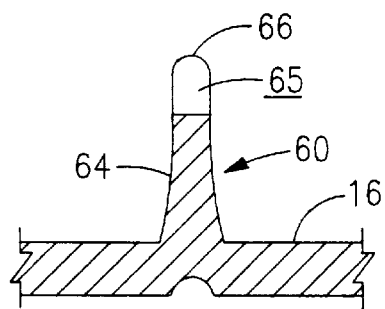
FIG. 9 is a section view taken along line 9—9 of FIG. 7.

In the embodiment of the present invention depicted in FIGS. 7, 8, and 9, at least one slot 65 is formed in the distal tip 66 of the flow barrier member 60. In the depicted embodiment, four slots 65 are provided, spaced ninety degrees apart, around the circumferential extent of the flow barrier member 60. Each slot 65 is cut in the flow barrier member 60 over a limited circumferential extent and advantageously is cut to a depth that is a fraction of the axial height, but not for the full axial height of the flow barrier member 60. Therefore, the base portion 64 of the flow barrier member 60 still extends for a complete circumference.

Figure 5:
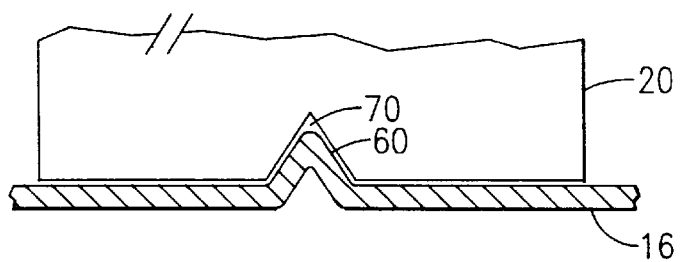
FIG. 5 is an enlarged fragmentary side elevational section view of one embodiment of the flow barrier of the present invention.
Figure 6:
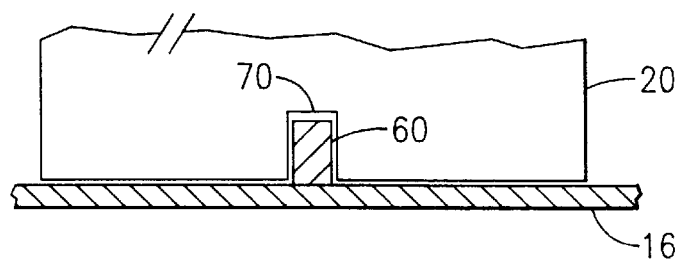
FIG. 6 is an enlarged fragmentary side elevational section view of another embodiment of the flow barrier of the present invention.

In both FIGS. 5 and 6, the filter element 20 is shown displaced away from the end closure member 16 for the purpose of illustrating the groove 70 in the filter element. In actual installation, the end of the filter element 20 would normally abut against the end closure member 16 when properly installed with the flow barrier member 60 received within the groove 70 in the filter element. If a filter element not provided with a circumferential groove in accordance with the present invention is installed within the filter assembly, the end face of that filter element would abut against the distal surface of the tip portion 66 of the flow barrier member 60. As the flow barrier member 60 would not penetrate into the filter element due to the absence of a circumferential groove in the end face of the element, no labyrinth seal would be formed. Further, a portion of the air flow would bypass the filter element by passing through the openings associated with slots 65 directly from the inlet chamber 30 into the clean air outlet 50, thereby contaminating the air flow leaving the filter assembly 10.

What is claimed is:

1. A filter assembly comprising:

a housing defining a filter chamber;

a fluid flow inlet opening to a first region of the filter chamber and a fluid flow outlet opening to a second region of the filter chamber;

a filter element disposed within the housing so as to extend between the first region of the filter chamber and the second region of the filter chamber; and flow barrier means extending from the housing and penetrating into the filter element for blocking fluid flow from bypassing the filter element when flowing from the first region of the filter chamber to the second region of the filter chamber.

2. A filter assembly comprising:

a housing defining a filter chamber;

a fluid flow inlet opening to a first region of the filter chamber and a fluid flow outlet opening to a second region of the filter chamber;

a filter element disposed within the housing so as to extend along an interface between the first region of the filter chamber and the second region of the filter chamber, the filter element having a groove formed therein along the interface between the first region of the filter chamber and the second region of the filter chamber; and a barrier member projecting from said housing into the filter chamber, the barrier member received within the groove in the filter element, whereby a physical barrier is provided to substantially preclude flow from passing from the first region to the second region without passing through the filter element.

3. A filter assembly as recited in claim 2 further comprising at least one circumferentially extending slot provided in a tip portion of the barrier member.

4. A filter element comprising:

an annular axially elongated filter media body having a central bore, a first end face at one axial end of the body and a second end face at the other axial end of the body, at least one of said end faces having a circumferentially extending groove formed therein for receiving a seal member, said groove penetrating into the filter media body.

* * * * *